March 29, 1960
K. ZOSEL
PROCESS FOR CONTINUOUSLY REACTING FINELY DIVIDED SOLIDS WITH LIQUIDS AND/OR GASES
Filed March 20, 1957
2,930,808
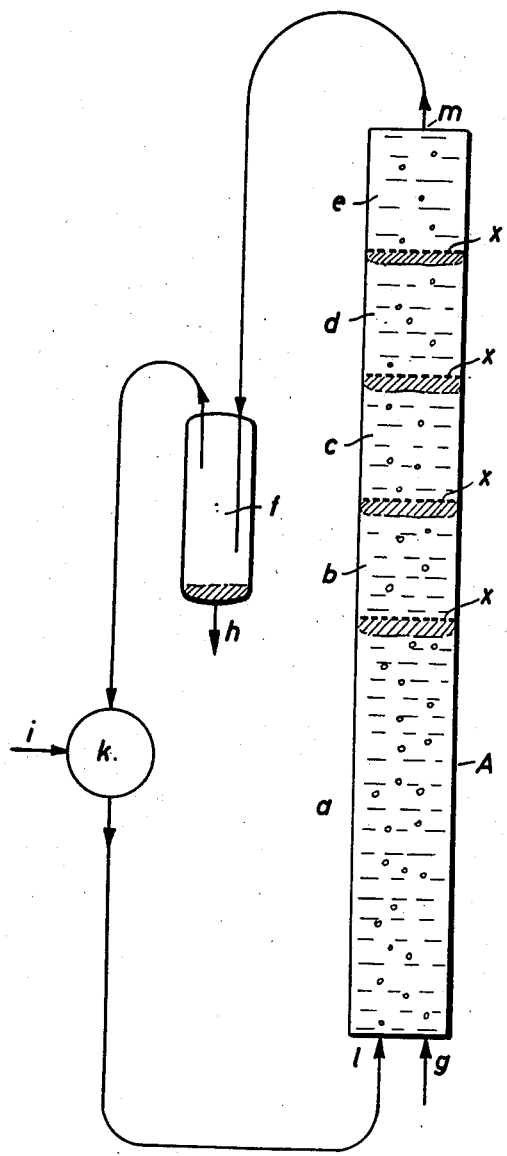
INVENTOR.
KURT ZOSEL
BY
*Burger, Denklage + Sprung*
ATTORNEYS

United States Patent Office 2,930,808
Patented Mar. 29, 1960

2,930,808

PROCESS FOR CONTINUOUSLY REACTING FINELY DIVIDED SOLIDS WITH LIQUIDS AND/OR GASES

Kurt Zosel, Mulheim an der Ruhr, Germany, assignor to Studiengesellschaft Kohle m.b.H.

Application March 20, 1957, Serial No. 647,379

Claims priority, application Germany March 24, 1956

6 Claims. (Cl. 260—448)

This invention relates to a process for the continuous reaction of finely divided solids with liquids and/or gases, in which the finely divided solids travel through the reactor only once.

It is known that in a large number of continuous chemical processes the reactants react incompletely when they travel only once through the reaction zone. In order to make use of the unreacted reaction components, these must be separated from the product of the reaction and be re-introduced into the process with fresh starting material. When one of the reactants is a finely divided solid material, it is known that the separation and return thereof frequently involves great difficulties. In order to avoid this difficulty, complete reaction of the solid reaction component during a single passage through the reaction zone is extremely desirable. Such complete reaction can of course be obtained by carrying out the process in a plurality of series-connected reactors, but it is well known that the more equipment which is necessary for carrying out any process, the more expensive this process becomes.

It is only with a very few reactions that it has so far been possible to achieve complete reaction between finely divided solids and liquids and/or gases. By complete reaction of a reaction component is to be understood that the concentration of this component must have dropped, from its initial value on entering the reaction zone, to a value of zero on leaving the reaction zone.

For a process to be economic, it is also necessary to have the highest possible reaction velocity in addition to complete conversion. This is achieved in practically all reactions by thorough mixing of the different reactants. When only one reactor and a continuous method of conveyance are used, it has hitherto not been possible, with reactions between finely divided solids and gases and/or liquids, to avoid finely divided solids also being discharged, unless filters or decanting devices are additionally used. Additional filters make the carrying out of the process difficult, however, because they have to be replaced and cleaned, and the material decanted when decanting devices are used must be returned into the reactor.

When a plurality of series-connected reactors which are continuously and successively traversed by the reaction components are used, the result achieved, as already mentioned, is that the concentration of the finely divided solid consituents continuously drops from its initial value in the first reactor to a zero value in the last reactor. However, it has also been mentioned that the use of several reactors increases the cost of the process, especially when working under pressure.

It has now been found that continuous and complete reaction of finely divided solids with liquids and/or gases can be achieved in only one reactor if the reaction is carried out in a single reactor as if this single reactor consisted of several series-connected reactors. This effect is achieved by fitting screening plates in a vertical and relatively long reactor, and the present invention provides a process for the continuous reaction of finely divided solids with liquids and/or gases to form liquid reaction products, the solid particles only passing once through the reactor, wherein a uniform stream of gas is constantly passed in circulation in an upward direction through a vertically disposed reactor provided with screening plates and completely filled with liquid at such a speed that gas buffers are formed underneath the screening plates, while the finely divided solids and the liquid are continuously supplied from below. Thus stable gas buffers are formed in the reactor, these buffers impeding the passage of liquid and suspended solid material through the reactor. The thickness of the gas buffers which are formed depends on the flow velocity. As a result of the perforations in the screening plates being given accurately predetermined dimensions and being sufficiently small (generally less than 1 mm. across) the result is achieved that, during the passage of the stream of gas, no liquid is able to flow downward through the screening plates, so that in effect the reactor is split up into several reactors by the installation of the screening plates. On the other hand, the liquid and finely divided solid reaction components, which are simultaneously and continuously introduced into the reactor from below pass without any obstruction in an upward direction through the screening plates after being thoroughly mixed. This is practically equivalent to the overflowing of a full vessel into a vessel disposed adjacent thereto.

When the process of the invention is used for reactions between solids and liquids, an inert gas is preferably caused to flow through the reactor. For reactions between gases and solids, assistance is obtained in carrying out the continuous process of the invention by using an inert liquid, for example an inert solvent, for filling the reactor. With reactions between solids, liquids and gases, it is advisable for an additional gas to be continuously introduced into the circulation.

The invention will now be explained by reference to the single figure of the accompanying drawings.

An elongated vertically disposed, cylindrical reactor A is subdivided into compartments $a$, $b$, $c$, $d$, and $e$ by four screening plates X. Gas used for the reaction is fed into this reactor at $l$, leaves the reactor at $m$ and is returned by way of a separator $f$ and a circulating pump $k$ to the gas inlet $l$. By this means, the gas buffers represented in the drawing are formed beneath the screening plates X. The other reactants, that is to say finely divided solids and liquid, are continuously supplied to the reactor through an inlet $g$.

Only such an amount of substance passes from the compartment $a$ through the first screening plate, and, after thorough mixing, into the compartment $b$, per unit of time as is supplied to the reactor at $g$. This means that the main proportion of the finely divided solids only reaches the compartment $b$ after having been a certain time in the compartment $a$.

This effect also occurs with the screening plates at the higher levels. By giving the reactor appropriate dimensions, which depend on the reaction components being used at the time, and by fitting an appropriate number of screening plates, it is readily possible, with a specific solution, to obtain a concentration of solid component in the compartment $e$ which is equal to zero. It follows from this that a reaction product which no longer contains any solid substances can be extracted at $h$ from the separator $f$.

With simultaneous reactions between solids, liquids and gases, it is advantageous for gas to be introduced into the cycle continuously at $i$ by way of the circulating pump $k$.

The process of the invention has been used with excellent results for reacting aluminium with olefines and hydrogen, especially for the production of aluminium tri-alkyls.

The process of the invention is further illustrated by the following examples.

*Example 1*

A reactor which is 4 metres long, is provided with 5 screening plates and has a capacity of 30 litres is completely filled with aluminium tri-isohexyl, and a hydrogen circulation in an upward direction at a rate of 250 litres per hour is constantly maintained with a pressure of 200 atm. A suspension of 0.5 kg. of finely divided aluminium in 6 kg. of 2-methyl pentene-1 is continuously introduced every hour at the bottom end of the reactor and at the same time the hydrogen used up is replenished. The reaction temperature is maintained at 135° C. A mixture free from aluminium particles flows from the separator, this mixture after allowing for aluminium tri-isopropyl to be returned to the reactor having the following composition: 80% by weight of aluminium tri-isohexyl, 12% by weight of isohexane and 8% by weight of 2-methyl pentene-1.

*Example 2*

A suspension of 0.5 kg. of finely divided aluminium in 6 kg. of aluminium tri-ethyl is introduced every hour into the bottom end of a reactor which is the same as in Example 1, but this time is filled with aluminium tri-ethyl, under the same working conditions as in Example 1. A mixture free from aluminium particles runs out of the separator, this mixture comprising 73% by weight of aluminium diethyl hydride and 23% by weight of aluminium tri-ethyl.

*Example 3*

A circulation of carbon monoxide at a rate of 200 litres per hour and a pressure of 100 atm. is constantly maintained in a reactor which is 5 metres long and is provided with 10 screening plates, the capacity of the reactor being 40 litres; the reactor is completely filled with petroleum. The working temperature is 120° C. 1 kg. per hour of finely divided active iron suspended in 15 kg. of petroleum is introduced at the bottom end and, as in the first two examples, the gas which is used up (in this case carbon monoxide) is constantly replenished. A solution of iron pentacarbonyl in petroleum, free from iron particles, discharges from the separator.

*Example 4*

A constant circulation of nitrogen at a rate of 150 litres per hour under atmospheric pressure is maintained in a reactor which is 3 metres long and has 6 screening plates, the capacity of the reactor being 10 litres and the reactor being completely filled with di-isobutyl ether. The working temperature is 35° C. At the bottom end, a suspension of 0.2 kg. of finely divided magnesium in 6 litres of di-isobutyl ether is introduced each hour through an inlet, and simultaneously 1.29 kg. of bromobenzene are introduced through a second inlet. A solution of phenyl magnesium bromide in di-isobutyl ether discharges from the separator, this solution being free from magnesium particles.

What I claim is:

1. In a process in which a finely divided solid is contacted with a fluid for reaction therewith, the improvement which comprises establishing a vertically extending reaction zone substantially filled with liquid and subdivided into a multiple number of adjacent vertical sections by screening plates, substantially continuously passing a gas upwardly through said reaction zone at a rate sufficient to accumulate gas under said plates, thereby forming gas buffers and substantially continuously passing finely divided solids and liquid upwardly through said reaction zone, at least one of said gases and liquids comprising the reactant for said solid.

2. Improvement, according to claim 1, in which said liquid comprises the reactant for said solid and in which said gas is an inert gas.

3. Process, according to claim 1, in which said gas comprises the reactant for said solid and in which said liquid is an inert liquid.

4. Improvement, according to claim 3, in which said inert liquid is an inert solvent.

5. Improvement, according to claim 1, in which both said gas and liquid comprise the reactant for said solid and which includes substantially continuously passing an additional gas upwardly through said reaction zone.

6. Improvement, according to claim 1, in which said finely divided solid comprises finely divided aluminum, said liquid an olefin, and said gas hydrogen, whereby an aluminum trialkyl is formed as a result of the reaction.

References Cited in the file of this patent

UNITED STATES PATENTS

| | | |
|---|---|---|
| 2,730,556 | Liedholm | Jan. 10, 1956 |
| 2,759,985 | Root | Aug. 21, 1956 |